United States Patent
Hwang et al.

(10) Patent No.: US 7,878,080 B2
(45) Date of Patent: Feb. 1, 2011

(54) APPARATUS FOR ADJUSTING POSITION OF VERTEBRAL COLUMN OF DUMMY MODEL FOR ESTIMATING FEELING OF SITTING IN SEAT

(75) Inventors: Su Hwan Hwang, Hwaseong-si (KR);
Seok Hwan Kim, Gunpo-si (KR);
Hyung Yun Choi, Seoul (KR); In Bae Chang, Chuncheon-si (KR); Kyung Min Kim, Seoul (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 512 days.

(21) Appl. No.: 11/967,460

(22) Filed: Dec. 31, 2007

(65) Prior Publication Data
US 2009/0025492 A1 Jan. 29, 2009

(30) Foreign Application Priority Data
Jul. 27, 2007 (KR) ...................... 10-2007-0075959

(51) Int. Cl.
*G01M 9/00* (2006.01)
(52) U.S. Cl. ................................... 73/866.4
(58) Field of Classification Search ....................... None
See application file for complete search history.

(56) References Cited

U.S. PATENT DOCUMENTS 3,557,471 A * 1/1971 Payne et al. .................. 434/270
6,131,436 A * 10/2000 O'Bannon et al. ............... 73/7
6,840,125 B1 * 1/2005 Reynolds et al. ........... 73/866.4

* cited by examiner

*Primary Examiner*—Robert R Raevis
(74) *Attorney, Agent, or Firm*—Morgan, Lewis & Bockius LLP (57) ABSTRACT

An apparatus for adjusting a position of the vertebral column of a dummy model for estimating the feeling of sitting in a seat almost exactly mimics the characteristics of the vertebral joints of a human being. The apparatus comprises a pelvic plate; a plurality of lumbar joints, stacked on the pelvic plate so as to be spaced apart from each other, and having joint springs installed in front and rear portions thereof centered around a rotation center interconnecting two adjacent ones thereof; femur joints rotatably installed below the pelvic plate, and connected with one end of each femur bar; and pelvic pivoting members transmitting rotating force of the femur joints, which is caused by vertical pivoting of the femur bars, to the pelvic plate, and changing a vertical angle of the pelvic plate.

10 Claims, 10 Drawing Sheets

FIG.1

FIG. 2A kyphosis

FIG. 2B straight lumbar

FIG. 2C lordosis

APPARATUS FOR ADJUSTING POSITION OF VERTEBRAL COLUMN OF DUMMY MODEL FOR ESTIMATING FEELING OF SITTING IN SEAT

CROSS-REFERENCE TO RELATED APPLICATIONS

This application claims priority to Korean Application No. 10-2007-0075959, filed on Jul. 27, 2007, the disclosure of which is incorporated herein by reference.

BACKGROUND OF THE INVENTION

1. Field of the Invention

The present invention relates to an apparatus for adjusting a position of the vertebral column of a dummy model for estimating a feeling of sitting in a seat, which is used to obtain data for estimating the comfort or discomfort of newly developed seats, in which the dummy model sits instead of a human being.

2. Description of the Prior Art

Seats for automotive vehicles are designed such that an occupant can maintain as comfortable a position as possible. For this seat design, a dummy model for estimating the feeling of sitting in a seat is used.

Such a dummy model must be able to accurately reproduce the position of a human being who sits in a seat. In particular, the skeletal or articular structure of the human being, which is associated with a vertebral column and is an important factor in determining the comfort/discomfort in the state in which the human being takes a seat, needs to be mimicked in the dummy model.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and an object of the present invention is to provide an apparatus for adjusting the position of the vertebral column of a dummy model for estimating the feeling of sitting in a seat, which almost exactly mimics the characteristics of the vertebral joints of a human being.

In order to achieve the above object, according to the present invention, there is provided an apparatus for adjusting the position of the vertebral column of a dummy model for estimating the feeling of sitting in a seat.

The apparatus comprises: a pelvic plate; a plurality of lumbar joints, which are stacked on the pelvic plate, are spaced apart from each other, and have joint springs installed in front and rear portions thereof, centered around a rotation center interconnecting two adjacent ones thereof; femur joints, which are rotatably installed below the pelvic plate and are connected with one end of respective femur bars; and pelvic pivoting members, which transmit rotating force of the femur joints, which is caused by vertical pivoting of the femur bars, to the pelvic plate and change the vertical angle of the pelvic plate.

Here, the pelvic pivoting members may connect the femur joint with the pelvic plate, one of which is connected on the front side of a lower surface of the pelvic plate and the other of which is connected on the rear side of the lower surface of the pelvic plate.

Further, the pelvic pivoting members may adjust preload or tension.

Each lumbar joint may include a joint housing, which can be rotated via a housing shaft passing through the joint housing in a transverse direction, a spacer, which is disposed between the joint housings, which are stacked on one another, and joint springs, which are disposed in front of and behind the spacer.

Further, each joint housing may be connected with the housing shaft of the lower joint housing, located beneath it, at the lower end thereof.

Also, the spacer may have a hollow hole, and the lower end of each joint housing and the housing shaft of the lower joint housing, located beneath it, may be fastened to each other by a fastening member passing through the lower portion of the joint housing and the spacer.

Further, each joint housing may include seating recesses, into which ends of respective spacers and joint springs are seated, in upper and lower surfaces thereof, and the seating recess for the spacer may have a shape of ellipse and a diameter greater than that of the spacer.

In addition, each lumbar joint may include a rotational angle sensor, and the spacer may be made of an elastic material.

According to the apparatus for adjusting the position of the vertebral column of a dummy model for estimating the feeling of sitting in a seat, because the characteristics of the vertebral joints of the human being depending on changes in the position of an upper part and each femur of the human being, who sits in a seat, are almost exactly mimicked, a seat comfort/discomfort performance test can be accurately performed.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 1:
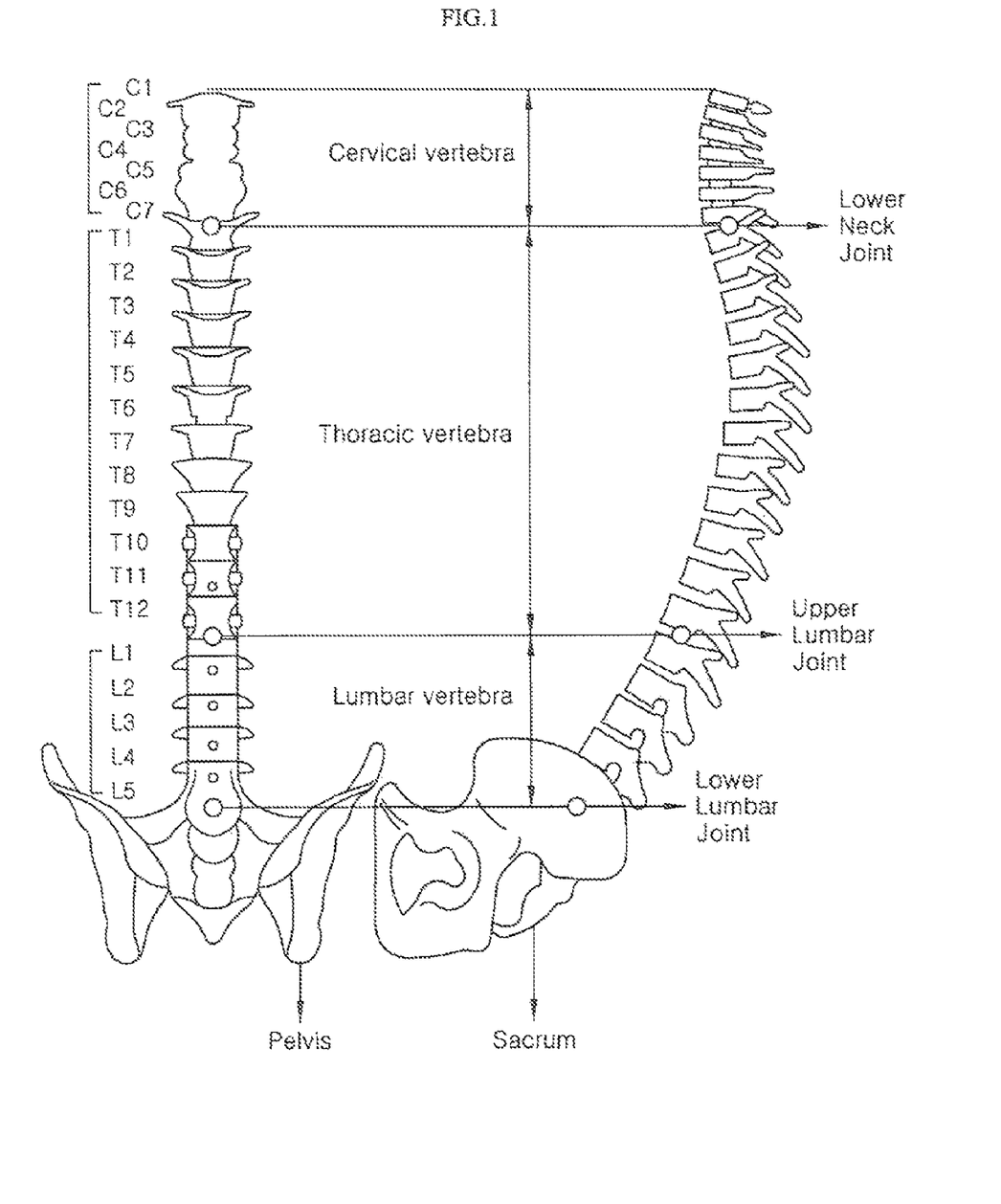
FIG. 1 is a view illustrating the structure of a vertebral column of a human body.

First, as for the vertebral structure of a human body, with reference to FIG. 1, the vertebral column of the human body is roughly constituted of a lumbar region, a thoracic region, and a cervical region, which are sequentially connected to a pelvis, located at a lower portion thereof. The lumbar region, the thoracic region, and the cervical region consist of 5, 12 and 7 vertebrae, respectively.

Figure 2A:
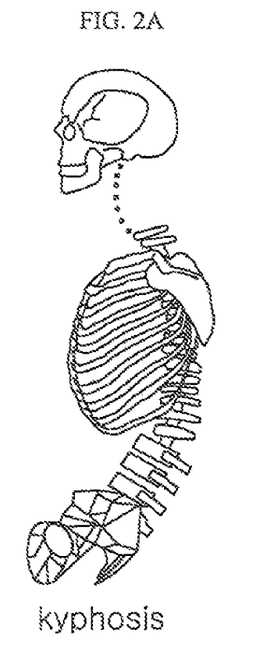
FIGS. 2A, 2B and 2C are side views illustrating the deformation of the vertebral column caused by a change in position of the upper part of a human body.
Figure 2B:
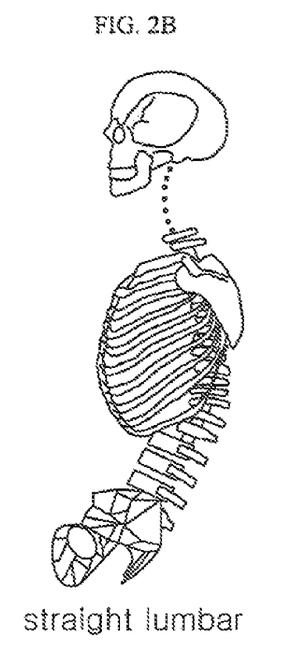
Figure 2C:
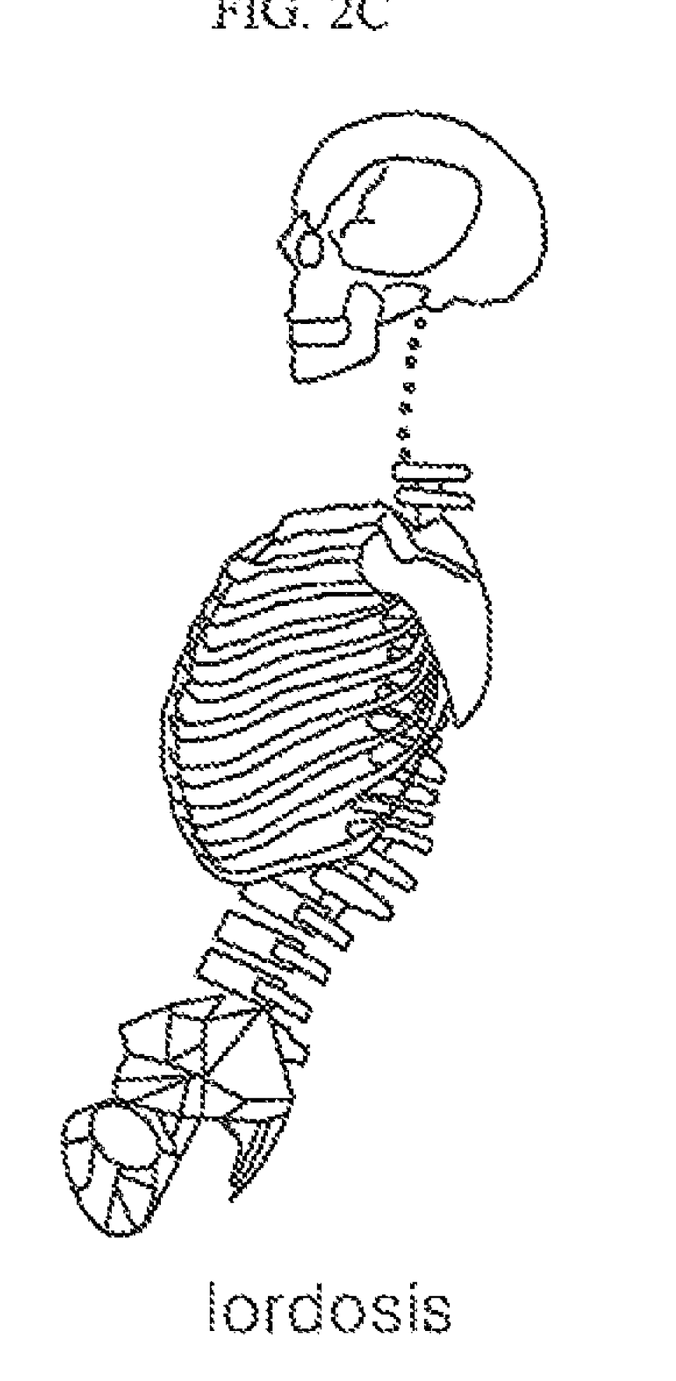
Figure 3A:
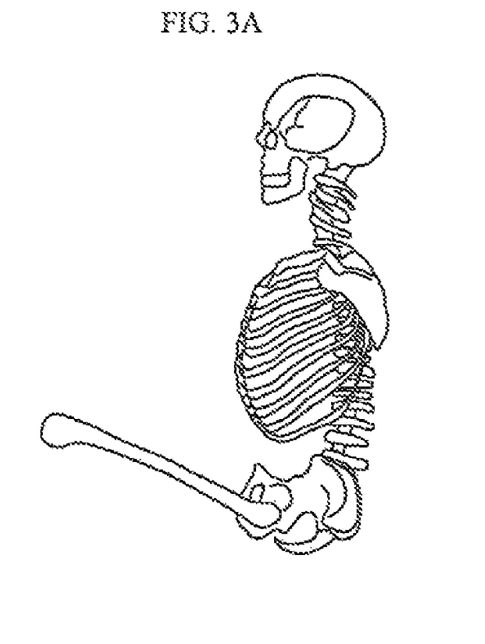
FIGS. 3A and 3B are side views illustrating the deformation of a vertebral column caused by a change in position of the lower part of a human body.
Figure 3B:
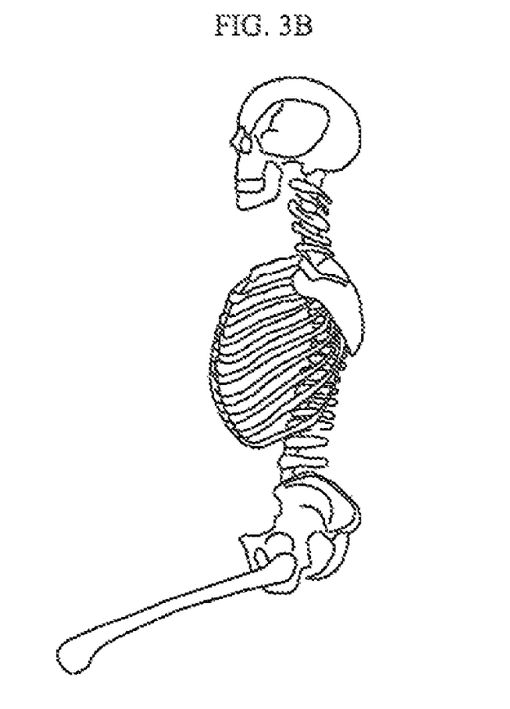

As for a change in position of the human vertebral column caused by changes in upper and lower parts of a human being who sits in a seat, it can be seen from FIGS. 2A, 2B, 2C, 3A and 3B that the deformation of the lumbar region is predominant. In other words, as illustrated in FIGS. 2A, 2B and 2C, the lumbar region suffers from rearward curvature (see FIG. 2A), or forward curvature (see FIG. 2B) according to the direction in which the upper part of the human being is bent. Further, as illustrated in FIGS. 3A and 3B, in the case where the thighs are angled higher than the horizontal position (see FIG. 3A), the pelvis is rotated forward, and thus the lumbar region is bent rearward. In the case where the thighs are angled lower than the horizontal position (see FIG. 3B), the pelvis is rotated backward, and thus the lumbar region is bent forward. The deformation of the lumbar region is relatively slight compared to that of the thoracic region.

Figure 4:
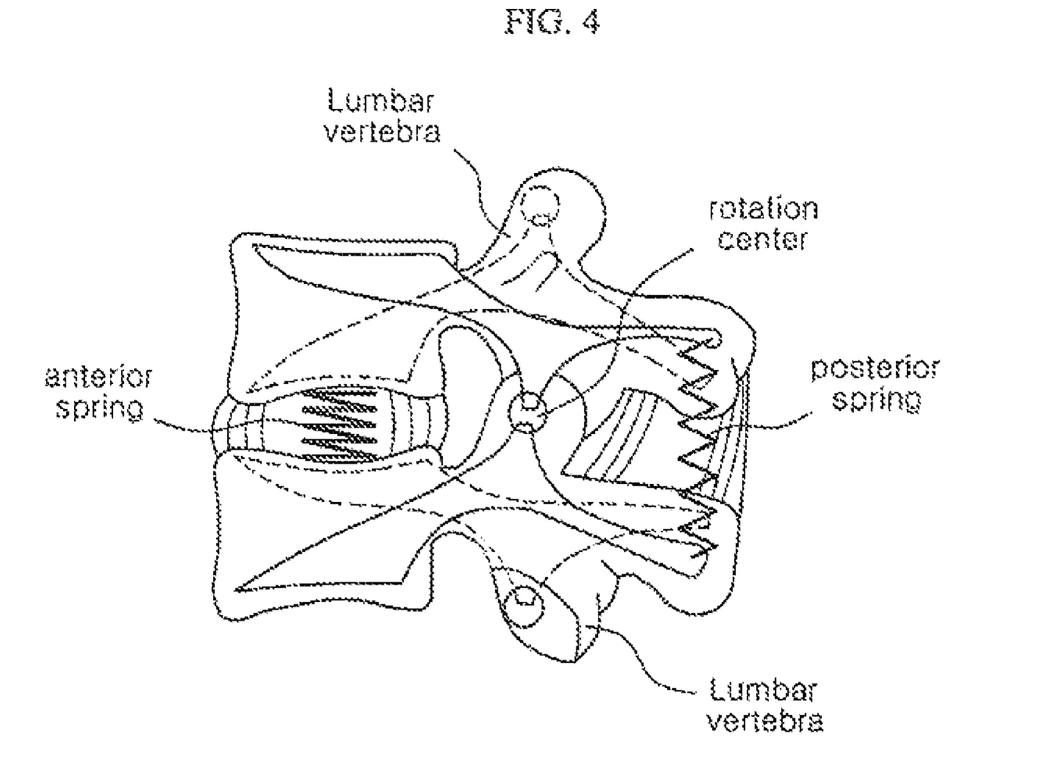
FIG. 4 is a schematic view illustrating the principle of operation of a vertebral joint.

Meanwhile, because the vertebral column is bent in a forward or rearward direction, each lumbar vertebra is rotated around a joint in a forward or rearward direction while a disc is deformed by a surrounding muscle/ligament. As illustrated in FIG. 4, this lumbar region can be modeled using a rotating joint, anterior and posterior sides of which are supported by springs on the basis of a rotation center. The rotating joint can be rotated in a forward or rearward direction only when it must overcome elastic force of each preloaded spring.

Figure 5:
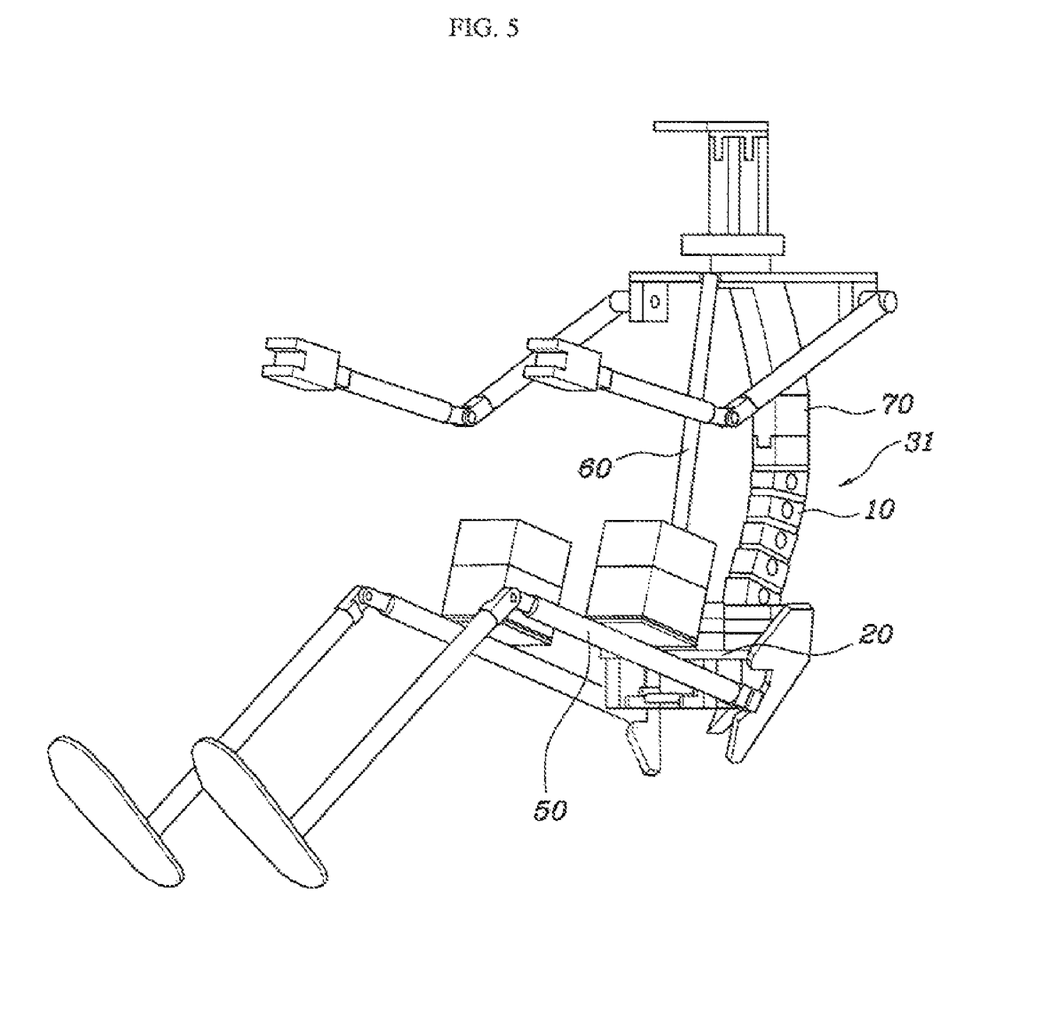
FIG. 5 is a view illustrating one example of a dummy model for estimating the feeling of sitting in a seat, to which an apparatus for adjusting the position of the vertebral column according to an exemplary embodiment of the present invention is applied.

In FIG. 5, the dummy model for estimating the feeling of sitting in a seat, to which the above-mentioned vertebral column model is applied, is illustrated as one example. The dummy model comprises a rod 60 connecting a shoulder girdle and a pelvic plate 20 thereof in order to restrict changes in the position of the vertebral column within a predetermined range together with the limbs, the vertebral column, and a neck/head. When the angle of the pelvic plate 20 of the dummy model is changed, the shape of the vertebral column 31, particularly each lumbar joint 10, is changed. The angular change of the pelvic plate 20 is associated with a change in the angle of each femur bar 50.

An apparatus for adjusting the position of the vertebral column of a dummy model for estimating the feeling of sitting in a seat in accordance with an exemplary embodiment will be described with reference to FIG. 6.

The apparatus for adjusting the position of the vertebral column 31 has a structure in which a plurality of lumbar joints 10 is stacked on the pelvic plate 20, and in which pelvic springs 30, femur joints 40, and femur bars 50 are installed below the pelvic plate 20.

The plurality of lumbar joints 10 are stacked such that they are spaced apart from each other using spacers (not shown). Joint springs 9 are installed parallel to each other in front of and behind each spacer. The structures of each spacer and lumbar joint 10 will be described below.

Each femur joint 40 is installed so as to be able to be rotated around a rotational shaft 41 below the pelvic plate 20. As another exemplary embodiment of the present invention, each femur joint 40 can be rotated together with the rotational shaft 41. In this case, a support member having a bearing supporting the rotational shaft 41 is required. Each femur joint 40 is connected to the lower surface of the pelvic plate 20 by two pelvic springs 30, and allows the femur bar 50, connected thereto, to be pivoted upwards about the rotational axis 41.

The pelvic springs 30 function to transmit the rotation of each femur joint 40, which is caused by the upward pivoting of each femur bar 50, to the pelvic plate 20 and thereby change the relative position of the pelvic plate 20. It should be noted that each pelvic spring is merely illustrated as a simple spring, a pelvic pivoting member, for the conceptual description of the pelvic pivoting member in FIG. 6, and thus the actual design of the pelvic pivoting member can be varied and any other shape may be employed and included as long as they carry out the function of the pelvic pivoting member.

Figure 6:
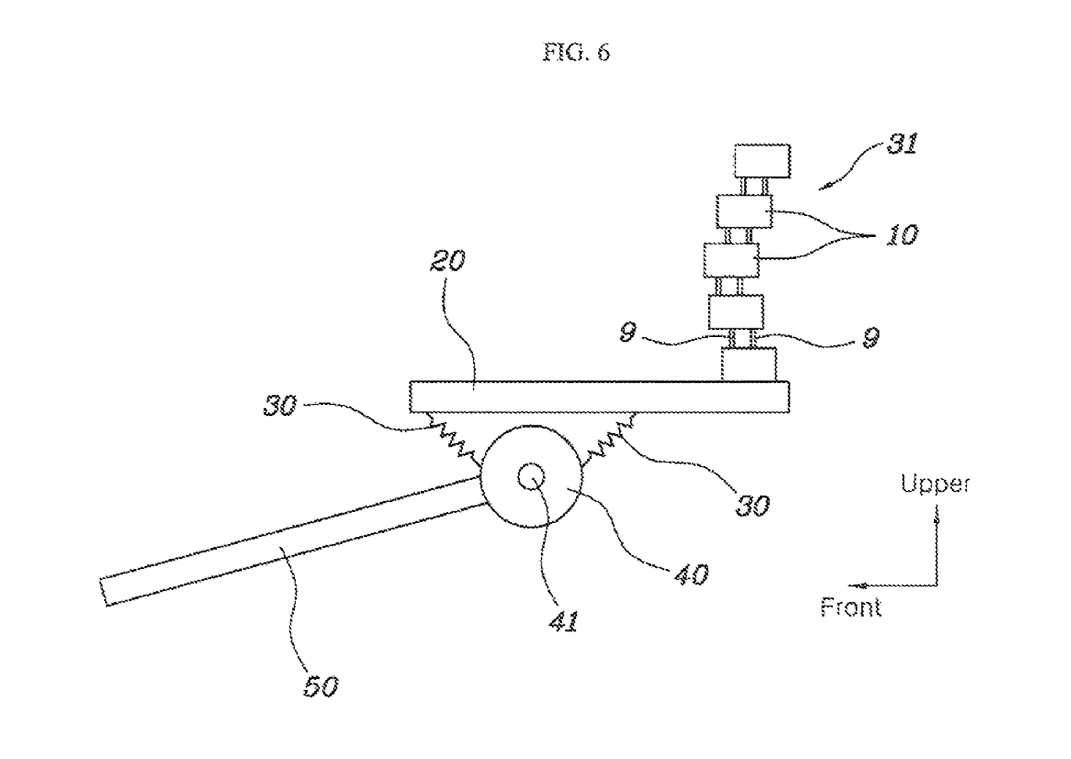
FIG. 6 is a conceptual view illustrating an apparatus for adjusting the position of the vertebral column according to an exemplary embodiment of the present invention.

Meanwhile, one of the two pelvic springs illustrated as an exemplary embodiment of the pelvic pivoting member in FIG. 6 is connected to the front side of the pelvic plate 20, and the other pelvic spring is connected to the rear side of the pelvic plate 20. When the femur joint 40 is rotated in a clockwise direction in the drawing, the front-side pelvic spring is compressed to push up the front end of the pelvic plate 20, while the rear-side pelvic spring is stretched. In contrast, when the femur joint 40 is rotated in a counterclockwise direction, the opposite phenomenon takes place. Preferably, the pelvic springs 30 are adapted to adjust preload or tension after being assembled to the apparatus to adjust the position of the vertebral column. The pelvic springs 30 serve to adjust the pivoting angle of the pelvic plate 20 to that of each femur bar 50.

Meanwhile, the plurality of lumbar joints 10 on the pelvic plate 20 can be naturally bent forward or rearward, like the vertebral column of a human body, when the pelvic plate 20 is rotated.

The lumbar joints according to an exemplary embodiment of the present invention and the connecting structure between them will be described with reference to FIGS. 7, 8 and 9 together with the above-described figures.

Figure 7:
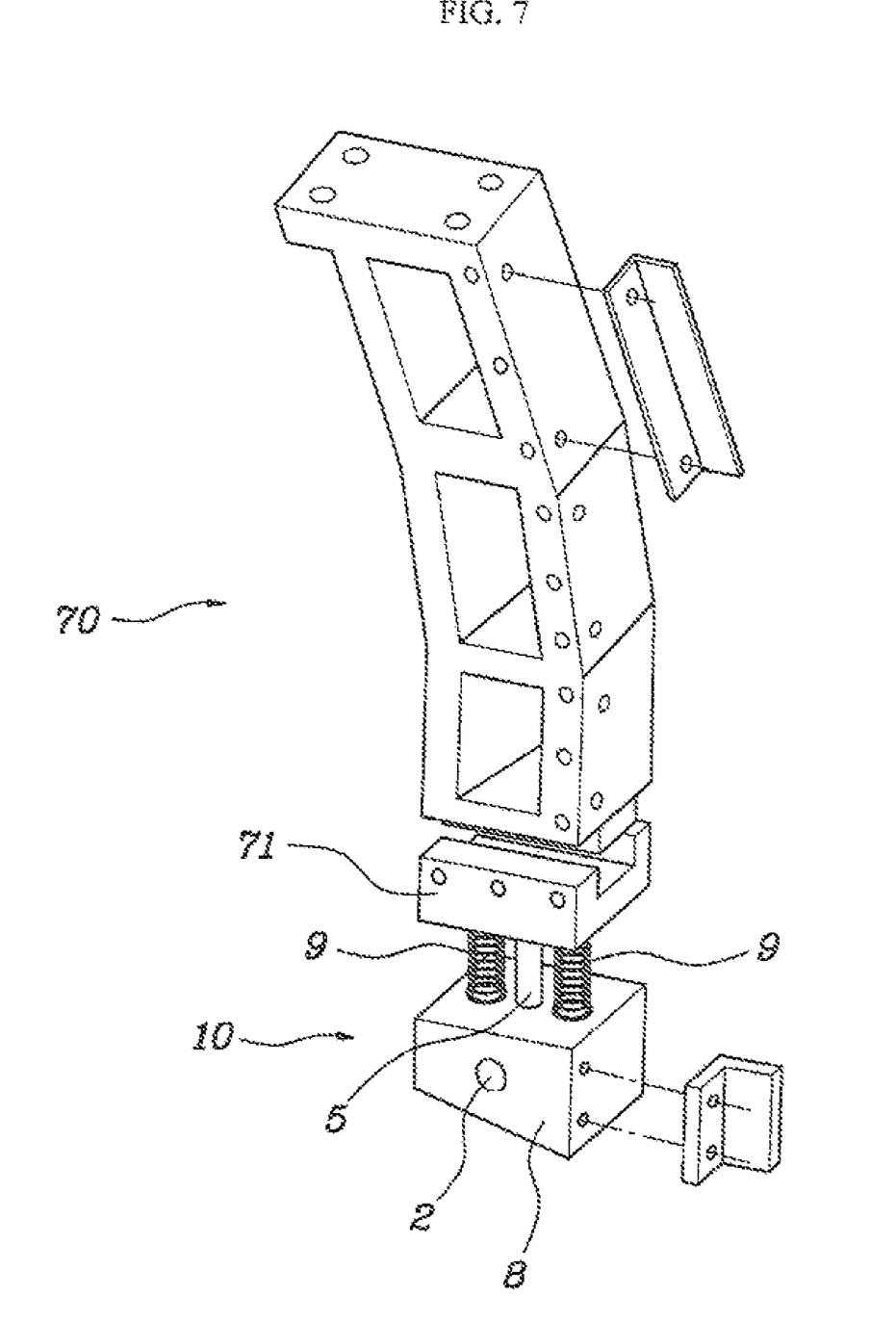
FIG. 7 is a view illustrating the lumbar joints and a thoracic region column of an apparatus for adjusting the position of the vertebral column according to an exemplary embodiment of the present invention.

In FIG. 7, the lumbar joint 10 and a thoracic region column 70 stacked on the pelvic plate 20 are illustrated. As illustrated in FIG. 7, the lumbar joint 10 corresponds to the lumbar vertebra L1 of the human body, and a connecting joint 71 corresponds to the thoracic vertebra T12 of the human body. The lower end of the thoracic region column 70 is fixedly coupled to the connecting joint 71, and the lumbar joint 10 is coupled under the connecting joint 71 so as to be able to be rotated around a housing shaft 2. The lumbar joints corresponding to the lumbar vertebrae L2 through L5 have the same structure as the lumbar joint illustrated in FIG. 7.

Two joint springs 9, disposed between the lumbar joint 10 and the connecting joint 71, are compressed or stretched at the same time, thereby adjusting the rotational angle of the lumbar joint 10. A spacer 5, disposed between the two joint springs 9, adjusts the interval between the lumbar joint 10 and the connecting joint 71, and functions as the rotation center of the lumbar joint 10. This spacer 5 is made of metal, flexible material such as urethane, or elastic material, in order to estimate, for instance, a positional change caused by compression of the disc when an occupant takes a seat.

The configuration of the lumbar joint 10 will be described in greater detail with reference to FIGS. 8 and 9.

The lumbar joint 10 is designed so that a joint housing 8 is rotatably coupled to the housing shaft 2, and so that a potentiometer 1 is installed on one side of the housing shaft 2 in order to measure the rotational angle of the joint housing 8.

Figure 9:
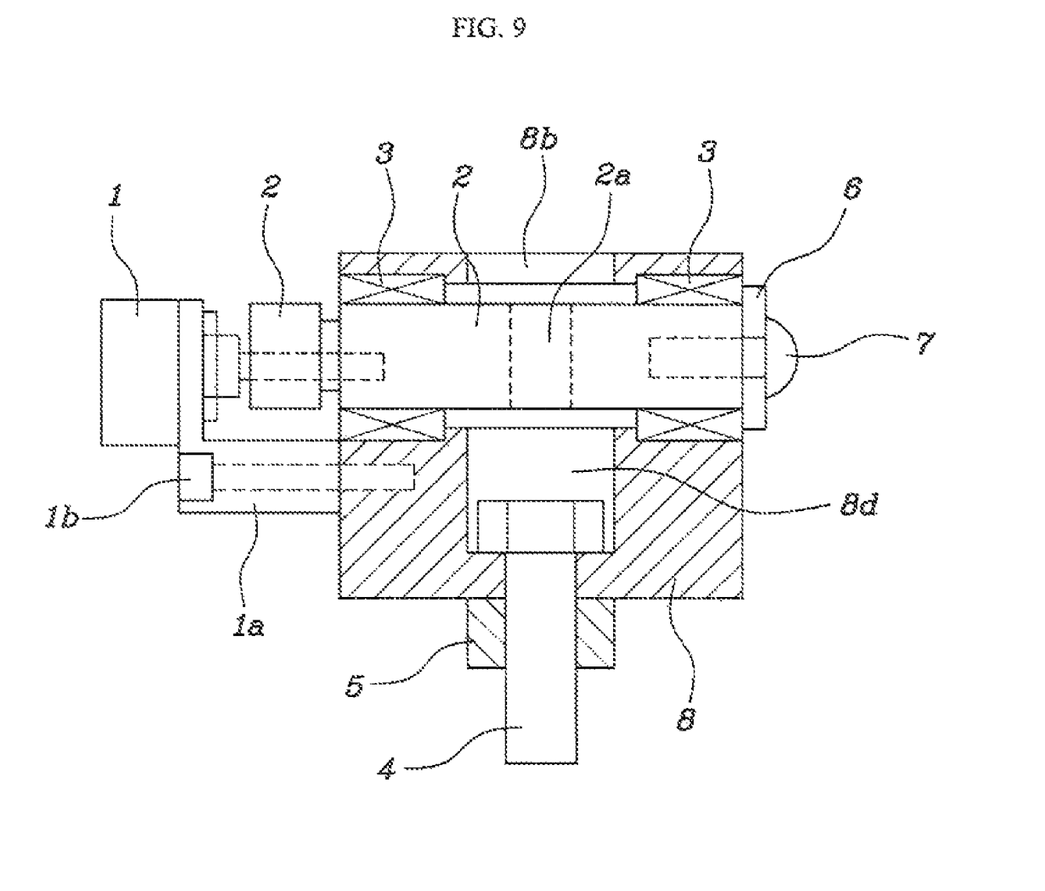
FIG. 9 is a schematic sectional view illustrating the lumbar joint of FIG. 7.

The housing shaft 2 is disposed in a transverse direction of the joint housing 8, and bearings 3 are coupled at both end portions of the housing shaft 2 and embedded into end portions of the joint housing 8 as shown in FIG. 9. The housing shaft 2, coupled to the joint housing 8, is connected with the potentiometer 1 on one end portion of the housing shaft 2, and the other end portion of the housing shaft 2 is fastened to the bearing 3 with a fixing bolt 7, which passes through a bearing anti-separation plate 6. Meanwhile, the housing shaft 2 has a threaded fastening hole 2a formed in the middle thereof in the perpendicular direction of the longitudinal axis of the housing shaft 2.

The joint housing 8 is provided with seating recesses 8b and 8c, into which the spacer 5a and the joint springs 9 are seated, respectively, in an upper portion thereof. The seating recess 8b for the spacer 5a has the shape of an ellipse having a diameter greater than that of the spacer 5. This serves to prevent the rotation of the joint housing 8 from being hindered by the spacer 5a seated in the seating recess 8b. Meanwhile, a fastening hole 8d for receiving a fastening bolt 4 is located beneath the seating recess 8b. The fastening bolt 4 fastens the spacer 5 under the joint housing. The fastening bolt 4 is suspended from a lower end of the joint housing 8 by the head thereof, and is fastened to a shaft of the joint housing, which passes through and is disposed below the hollow spacer 5, at the leading end thereof. Reference number 8a, which has not yet been described, indicates a shaft hole through which the housing shaft 2 passes and around which the bearing 3 is coupled to support the housing shaft 2.

Figure 8:
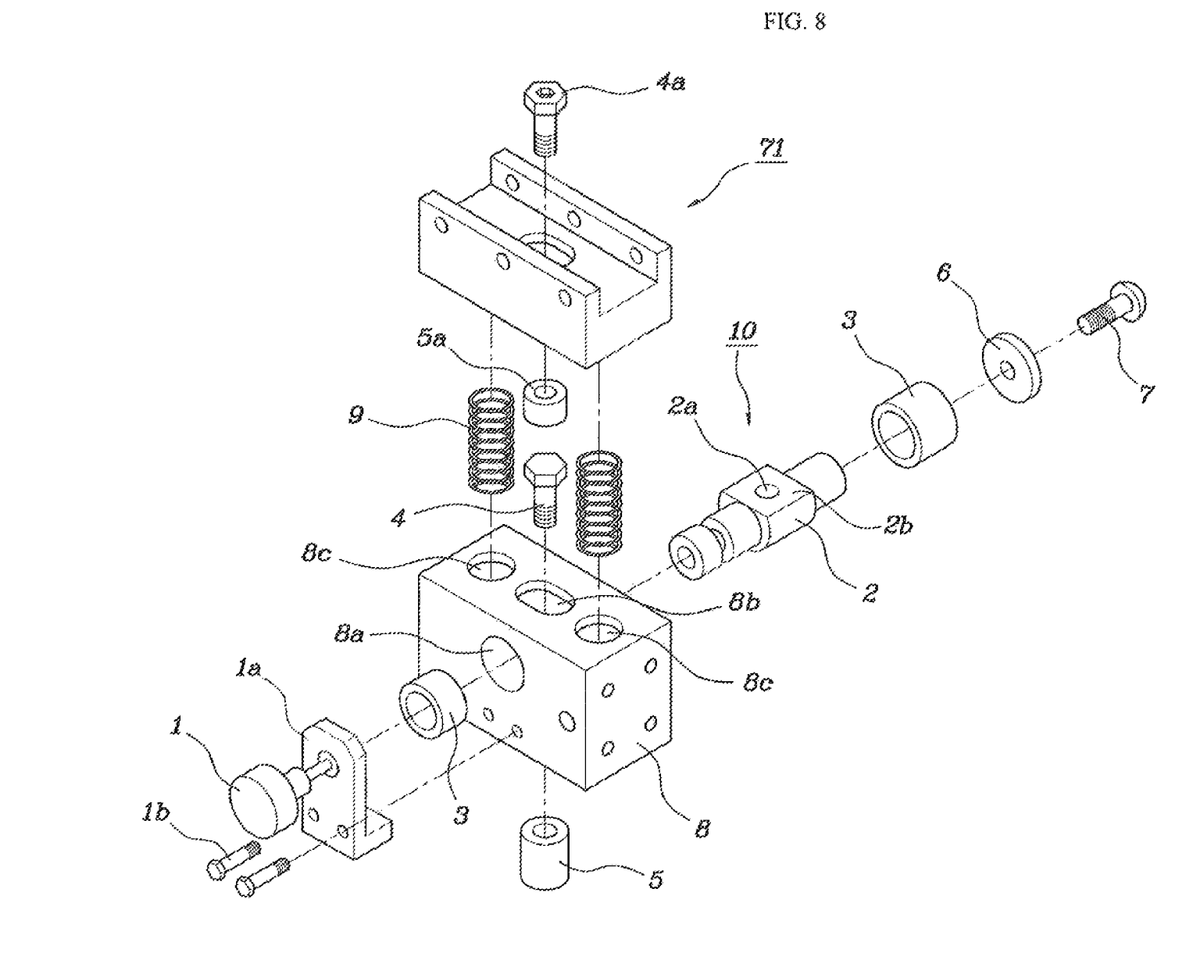
FIG. 8 is an exploded perspective view illustrating some of the parts of FIG. 7.

In FIG. 8, a fastening member 4a on the part of the connecting joint 71 passes through a spacer 5a, and then is fastened to the threaded fastening hole 2a of the housing shaft 2 located beneath it. The spacer 5a is seated on a upper flat portion 2b positioned in the middle of the housing shaft 2 through the seating recess 8b. Further, the fastening member 4 on the part of the joint housing 8 passes through the spacer 5, and is fastened to another joint shaft located beneath it.

Meanwhile, the potentiometer 1 is fixed to a support holder 1a, and is connected to the housing shaft 2 at the leading end thereof. The support holder 1a is fixed to the joint housing 8, and is rotated when the joint housing 8 is rotated. When the joint housing 8 is rotated, the potentiometer 1 detects the relative rotational angle of the joint housing 8, which is rotated around the housing shaft 2.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for adjusting a position of a vertebral column of a dummy model for estimating a feeling of sitting in a seat, the apparatus comprising:
   a pelvic plate;
   a plurality of lumbar joints, which are stacked on the pelvic plate, are spaced apart from each other, and have springs installed in front and rear portions of the lumber joints with respect to a rotation center interconnecting two adjacent lumber joints;
   two femur bars;
   two femur joints, each of which is rotatably installed below the pelvic plate and is connected with one end of each the femur bar respectively; and
   two pelvic pivoting members coupling the two femur joints to the pelvic plate, wherein each of the two pelvic pivoting members transmits rotating force of each of the femur joints, which is caused by vertical pivoting of the femur bars, to the pelvic plate and change a vertical angle of the pelvic plate.

2. The apparatus according to claim 1, wherein each of the pelvic pivoting members includes two pelvic springs, one of the pelvic springs being connected to a front side of a lower surface of the pelvic plate and the other of the pelvic springs being connected to a rear side of the lower surface of the pelvic plate.

3. The apparatus according to claim 2, wherein the pelvic pivoting members adjust preload or tension.

4. The apparatus according to claim 1, wherein each lumbar joint includes:
   a joint housing that can be rotated around a housing shaft positioned in the joint housing in a transverse direction;
   a spacer that is disposed between the adjacent joint housings stacked on one another; and
   two joint springs, one of which is disposed in front of the spacer and the other of which is disposed behind the spacer.

5. The apparatus according to claim 4, wherein the adjacent joint housings include an upper joint housing and a lower joint housing and the upper joint housing is connected with the housing shaft of the lower joint housing located therebeneath at a lower end thereof.

6. The apparatus according to claim 5, wherein the spacer has a hollow hole, and the lower end of the upper joint housing and the housing shaft of the lower joint housing located therebeneath are fastened to each other by a fastening member passing through a lower portion of the upper joint housing and the spacer.

7. The apparatus according to claim 4, wherein each joint housing includes seating recesses, into which ends of the spacer and the joint springs are seated respectively, in upper and lower surfaces thereof, and the seating recess for the spacer has a shape of an ellipse and a diameter greater than that of the spacer.

8. The apparatus according to claim 7, wherein the housing shaft includes a upper flat portion wherein the spacer is seated on.

9. The apparatus according to claim 4, wherein each lumbar joint includes a rotational angle sensor.

10. The apparatus according to claim 4, wherein the spacer is made of elastic material.

* * * * *